W. W. GRISCOM.
Galvanic-Battery.
No. 207,270. Patented Aug. 20, 1878.
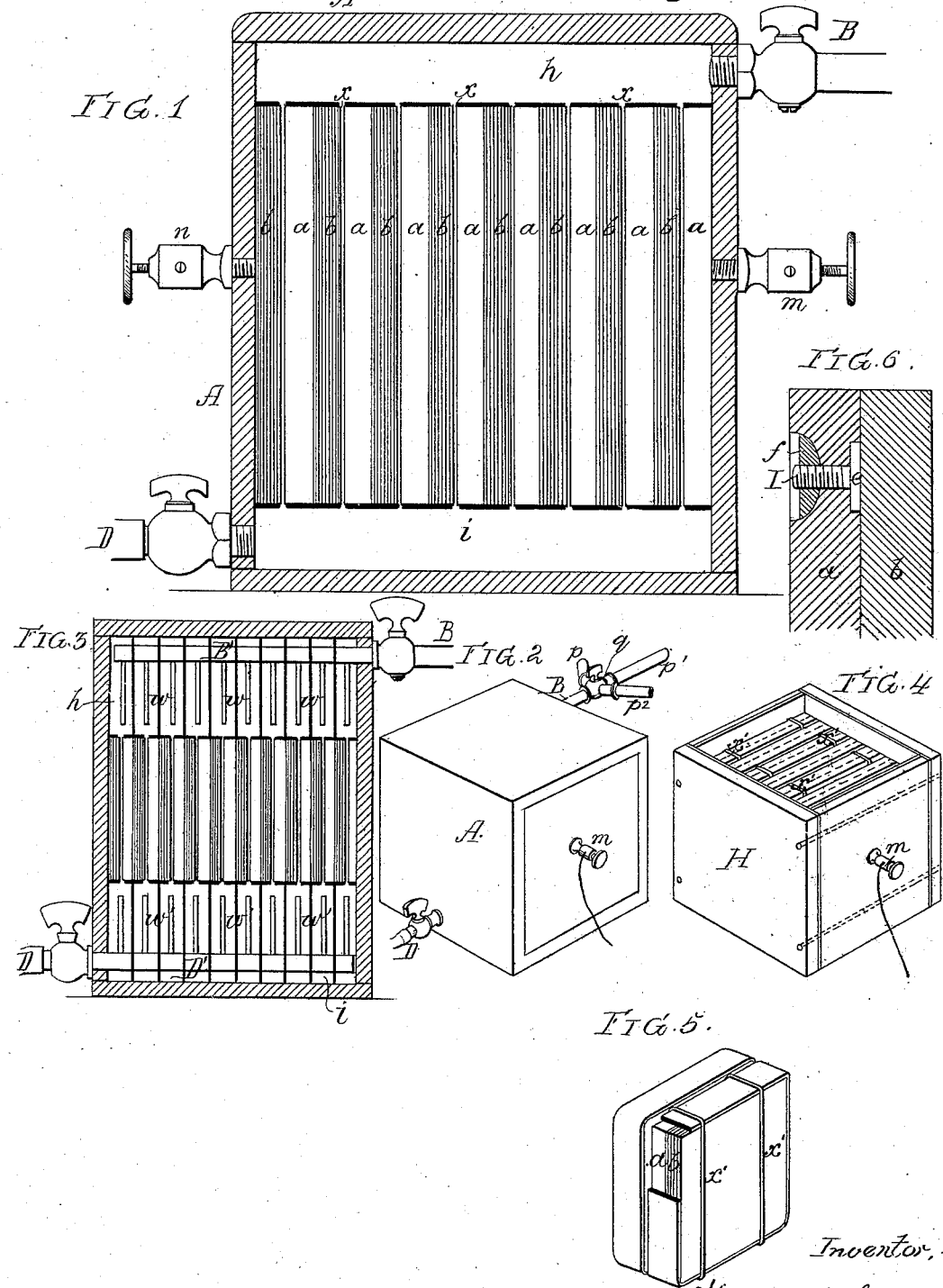

UNITED STATES PATENT OFFICE.

WILLIAM W. GRISCOM, OF PHILADELPHIA, PENNSYLVANIA.

IMPROVEMENT IN GALVANIC BATTERIES.

Specification forming part of Letters Patent No. 207,270, dated August 20, 1878; application filed July 13, 1878.

*To all whom it may concern:*

Be it known that I, WILLIAM W. GRISCOM, of Philadelphia, Pennsylvania, have invented a new and useful Improvement in Galvanic Batteries, of which the following is a specification:

The object of my invention is to construct a galvanic battery which will occupy but little space, will possess great power together with entire constancy, will admit of little or no waste, and will leave the entire control of the liquids in the hands of the operator, without subjecting him to the risk and inconvenience of accidental contact with the acids.

In the accompanying drawing, Figure 1 is a vertical section of my improved battery; Fig. 2, a perspective view; Fig. 3, a vertical section of a modification of the battery; Fig. 4, a perspective view, illustrating a modification of my invention; Fig. 5, a perspective view, showing part of Fig. 4; Fig. 6, an enlarged sectional view, showing a mode of securing the zinc and carbon plates together.

I prefer to make the outer case or box, A, Figs. 1 and 2, of hard rubber lined with soft rubber, or the casing may be made of wood or other material lined with rubber, or otherwise protected from the action of acid, the joints being made perfectly water-tight, and being closed on all sides; and I also prefer to so construct the box that all four sides and the top and bottom can be detached from each other, any suitable system of screws or clamping devices being used for so confining the parts that secure water-tight joints shall be assured.

In Fig. 1, $a\ a$ are a series of zinc or other suitable positive plates, and $b\ b$ carbon or other suitable negative plates, arranged in compound pairs, as in the ancient voltaic pile; but instead of separating the compound plates by means of felt or other porous material, in accordance with the usual plan, there are spaces $x$ between the pairs, each space being as narrow as circumstances will permit.

B is an inlet-pipe, communicating with an elevated reservoir containing the excitant liquid to be used in connection with the battery, the pipe being furnished with a suitable cock.

D is the outlet-pipe, furnished with a suitable cock, by means of which the discharge of the spent or partly-spent liquid may be regulated. The liquid must pass through the box under a sufficient pressure to enable it to flow smoothly and with the desired rapidity through the narrow spaces $x$, and in some cases the liquid may pass upward instead of downward through the said spaces.

It should be understood that the connected plates $a\ b$ throughout the series are protected on all four edges by rubber bands or otherwise, so that the faces only of the plates shall be exposed to the excitant liquid.

It should also be understood that the plates extend across the box or casing, and fit so snugly to the sides of the same that there can be no communication between the upper compartment, $h$, and lower compartment, $i$, of the box other than through the narrow spaces or channels $x\ x$.

Ordinary binding-screws $m\ n$ form the positive and negative poles of the battery.

The inlet and outlet cocks are so adjusted that when the battery is in operation the interior of the box shall be entirely filled with the excitant liquid, the latter flowing continuously through the narrow spaces $x$, and with sufficient rapidity to insure the continuous contact of fresh liquid with the faces of the plates.

The prominent advantages of my improved battery may be enumerated and explained as follows:

First. The internal resistance of the battery will be extremely minute, owing to the proximity of the compound plates to each other, so that but a thin stratum of liquid intervenes to oppose resistance to the passage of the current. The contiguity of the plates is also an important element for effecting depolarization, the increased friction of the fluid against the plates being due to this contiguity.

Second. The electro-motive force of the fresh liquid is not deteriorated by intermingling with spent or partly-spent liquid, owing to the flow of the liquid through the spaces between the plates under pressure, and without agitation.

Third. The tendency toward polarization is reduced by causing the fresh liquid to flow constantly and under pressure in contact with the surfaces of the plates.

Fourth. The resistance of the metallic connections between the plates is obviously very minute compared with that in ordinary batteries.

Fifth. The battery is contained within much less compass than those of ordinary construction.

Sixth. My improved battery can be dismounted and set up much more easily and rapidly than an ordinary battery.

Seventh. The discontinuance of the operation of the battery by discharging the liquid contents of the box is attended with but little waste, owing to the small amount of liquid intervening between the plates at any one time. In order to empty the box, the simple manipulation of the inlet and outlet cocks and a small air or water cock placed on the cover of the box is necessary, after which the battery may remain inactive for any desired length of time, and may be readily rendered active.

Eighth. The amalgamation of the plates may be readily effected by forcing a stream of mercury, or a solution of one of its salts, between said plates after they have been cleansed by a flow of acid through the box.

Ninth. Economy may be attained by using iron in place of zinc for the compound plates, because the proximity of the plates is such as to permit the use of a solvent which is of less power than usual, and if more powerful liquid is required it can be withdrawn from the box or casing, so as not to affect the iron during the time the battery is not in action.

Tenth. It is evident that very small plates may be substituted for large ones, since large plates only afford a greater current of electricity in so far as they diminish the tendency toward polarization and lessen the resistance.

It will be observed, on referring to the perspective view, Fig. 2, that any one of the three pipes $p$, $p^1$, and $p^2$ may be made to communicate with the inlet-pipe B by manipulating the plug of a four-way cock, $q$, of suitable material; or, in place of the latter, each of the three pipes may be furnished with a suitable cock or other mechanism for regulating the flow. In this case there should be three different elevated reservoirs containing different liquids, each reservoir communicating, through one of the pipes, with the interior of the box of the battery, so that by manipulating the cocks any one of the three kinds of liquid may be introduced into the said box, and caused to flow through the narrow spaces between the compound plates.

One of the reservoirs may, for instance, contain a solution known as the "bichromate solution," to be used when a battery of great strength is required, a second may contain dilute acid, and the third a solution of salt or sulphate of zinc, to be used when a weaker but more economical battery is required; or one of the reservoirs, or an additional reservoir, may contain pure water, for use in washing the plates or producing minute currents.

In the modification shown in Fig. 3, a series of partitions, $w$, extend across the box above the compound plates, and below the latter are a similar series of partitions, $w'$, each partition being in contact with the protected edges of the compound plates. The object of these partitions is to isolate each cell more or less completely. By extending the plates entirely across the box complete insulation may be maintained, if desired, without material increase of space.

In this modification I have shown an internal continuation, B', of the feed-pipe B, having nozzles or branches for the purpose of distributing the liquid to the different pairs of plates, the pipe passing through the partitions $w$, which extend to the top of the box. A similar continuation, D', of the discharge-pipe D is also shown.

The nozzles have for their object not only to afford a passage for the liquid, but also greatly to augment the resistance to electrical leakage from one cell to another, since the contracted columns the nozzles contain offer an enormous resistance to the passage of a current.

Figs. 4 and 5 illustrate a mode of confining together and spacing the compound plates.

Vertical bands or strips $x'$, of rubber or other suitable material, are passed around alternate pairs of compound plates, and these bands determine the width of the spaces $x$.

The whole of the plates are confined within a rubber-lined or other suitable frame, H, the sides of which are secured by suitable bolts or other fastenings, and this frame may be provided with cover and base, so as to constitute the box or casing.

In Fig. 6 the head $e$ of a bolt, I, is soldered to the zinc plate, and passes through the carbon plate, which is countersunk to receive the nut $f$ of the bolt, and is also countersunk for receiving the head; or the bolt may form a part of and project from the zinc plate.

If desired, the bolt-connection may be dispensed with, one face of the carbon plate being coated with copper by electro-deposition, and this copper-coated face then soldered to the zinc plate. In either case the desired electrical connection between the plates will be insured. The carbon plate, in the vicinity of the connections, should be saturated with paraffine or other suitable material, to prevent the access of acid to said connections.

In applying my invention to that class of batteries in which two excitant liquids are employed, each space $x$ may have a central porous diaphragm, one excitant liquid flowing through the space on one side of the diaphragm, and the other excitant liquid flowing through the space on the opposite side of said diaphragm, so that each volume of excitant liquid will be brought into contact with its respective plate.

I claim as my invention—

1. The mode herein described of preventing polarization of the plates and diminishing the internal resistance of a battery—that is to say, arranging the positive and negative plates of one or more cells in a tube, box, or case, with an intervening space between the plates of each cell, through which space or spaces the excitant liquid is caused to flow continuously and under pressure, all substantially as and for the purpose set forth.

2. The combination of a battery with two or more reservoirs containing different liquids, with communicating pipes, having a cock or cocks for opening the communication of any one of the reservoirs with the battery while the other communications are closed, as set forth, for the purpose specified.

3. The combination, in a battery, of two or more cells, arranged in a box or case, as described, with partitions $w$ and $w'$, all substantially as specified.

4. The combination of a box or case provided with partitions $w$ $w'$, and containing two or more pairs of plates, as described, with inlet and outlet pipes, having branches with nozzles or tubes, as and for the purpose set forth.

5. The combination of the zinc plate of one cell of a battery and the carbon plate of an adjoining cell with a bolt, I, soldered to or forming a part of plate $a$, all substantially as described.

In testimony whereof I have signed my name to this specification in the presence of two subscribing witnesses.

WM. W. GRISCOM.

Witnesses:
HARRY A. CRAWFORD,
HARRY SMITH.